US012046087B2

(12) United States Patent
McQuade

(10) Patent No.: US 12,046,087 B2
(45) Date of Patent: Jul. 23, 2024

(54) EVENT BASED GPS TRACKING

(71) Applicant: ZONAR SYSTEMS, INC., Seattle, WA (US)

(72) Inventor: Charles Michael McQuade, Issaquah, WA (US)

(73) Assignee: Zonar Systems, Inc., Seattle, WA (US)

( * ) Notice: Subject to any disclaimer, the term of this patent is extended or adjusted under 35 U.S.C. 154(b) by 0 days.

(21) Appl. No.: 16/106,651

(22) Filed: Aug. 21, 2018

(65) Prior Publication Data

US 2018/0357841 A1 Dec. 13, 2018

Related U.S. Application Data

(63) Continuation of application No. 13/830,807, filed on Mar. 14, 2013, now abandoned.

(60) Provisional application No. 61/610,975, filed on Mar. 14, 2012.

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01); *G07C 5/085* (2013.01)

(58) Field of Classification Search
CPC ....... G07C 5/008; G07C 5/085; G07C 5/0808
See application file for complete search history.

(56) References Cited

U.S. PATENT DOCUMENTS

| | | | |
|---|---|---|---|
| 6,064,970 A | 5/2000 | McMillan et al. | |
| 6,438,472 B1 | 8/2002 | Tano et al. | |
| 6,445,985 B1 | 9/2002 | Bitzer et al. | |
| 8,542,108 B1 | 9/2013 | Izpepski et al. | |
| 2002/0167519 A1 | 11/2002 | Olsen | |
| 2005/0083404 A1 | 4/2005 | Pierce et al. | |
| 2008/0086266 A1 | 4/2008 | Howard et al. | |
| 2008/0234888 A1 | 9/2008 | Zandarelli et al. | |
| 2008/0252487 A1* | 10/2008 | McClellan ....... | G06Q 10/06398 340/936 |
| 2008/0255723 A1 | 10/2008 | Sano | |
| 2008/0294339 A1* | 11/2008 | Tauchi ............... | G01C 21/3469 701/123 |
| 2009/0082919 A1 | 3/2009 | Hershey et al. | |
| 2009/0171528 A1 | 7/2009 | Golde | |
| 2010/0023207 A1 | 1/2010 | Medea et al. | |
| 2010/0049397 A1* | 2/2010 | Liu .................... | G01C 21/3469 701/31.4 |
| 2010/0223842 A1 | 9/2010 | Thesz et al. | |

(Continued)

*Primary Examiner* — Imran K Mustafa

(57) ABSTRACT

System and method for enabling predefined events to be used to trigger the collection of vehicle position data. A combination GSM device and GPS device is used to collect vehicle position data and to convey that position data to a remote computing device for review and/or analysis. There is a tradeoff between collecting too much data (cell phone bill is too high) and collecting too little data (value added analytics cannot be achieved without sufficient data). The concepts disclosed herein relate to method and apparatus to enable the data collection/transmission paradigm of such a GSM/GPS to be varied (or triggered) based on the detection of one or more predefined events. This enables data which can contribute to value added analytics to be acquired, without wasting airtime on unimportant data.

12 Claims, 9 Drawing Sheets

(56) References Cited

U.S. PATENT DOCUMENTS

| | | | | |
|---|---|---|---|---|
| 2011/0130916 | A1* | 6/2011 | Mayer | B60L 3/12<br>903/903 |
| 2011/0238300 | A1* | 9/2011 | Schenken | G06Q 50/28<br>701/408 |
| 2012/0316763 | A1* | 12/2012 | Haynes, III | G08G 1/09685<br>701/527 |
| 2013/0158850 | A1* | 6/2013 | Uchida | G01C 21/3469<br>701/123 |
| 2013/0211623 | A1* | 8/2013 | Thompson | H04L 67/12<br>701/1 |
| 2013/0245880 | A1 | 9/2013 | McQuade | |
| 2013/0302758 | A1 | 11/2013 | Wright | |
| 2014/0167954 | A1 | 6/2014 | Johnson et al. | |
| 2014/0195071 | A1 | 7/2014 | Hunt | |

* cited by examiner

EVENT BASED GPS TRACKING

RELATED APPLICATIONS

This application is a continuation of application, Ser. No. 13/830,807 filed on Mar. 14, 2013, which claims benefit of provisional application, Ser. No. 61/610,975, filed on Mar. 14, 2012, the benefit of the filing date of which is hereby claimed under 35 U.S.C. § 119(e), and incorporated by referenced as if fully set forth herein.

BACKGROUND

As the cost of sensors, communications systems and navigational systems has dropped, operators of commercial and fleet vehicles now have the ability to collect a tremendous amount of data about the vehicles that they operate, including geographical position data (generally referred to herein as GPS data, noting that position data can be collected by systems related to but distinct from the well-known Global Positioning System) collected during the operation of the vehicle.

Vehicle fleet operators often operate vehicles along predefined and generally invariant routes. For example, buses frequently operate on predefined routes, according to a predefined time schedule (for example, along a route that is geographically, as well as temporally defined). It would be desirable to provide new techniques for analyzing data collected from vehicles transiting such predefined routes over time, to aid in identifying vehicle performance problems requiring servicing.

Vehicle fleet operators often operate vehicles both on road and off road. Significantly, fuel tax is calculated differently for on-road and off-road use. It would be desirable to provide new techniques for analyzing data collected from vehicles operating both on road and off road, to enable fuel tax calculations to be performed more accurately.

Transmitting data from a vehicle to a remote server can be accomplished using GSM technology. There is a tradeoff between collecting too much data (cell phone bills are too high) and collecting too little data (value-added analytics cannot be achieved without sufficient data). It would be desirable to provide method and apparatus to collect useful amounts of data without wasting bandwidth on less valuable data.

SUMMARY

One aspect of the novel concepts presented herein is a system and method for enabling predefined events to be used to trigger the collection of such event data and vehicle position data. A combination GSM device and GPS device is used to collect vehicle position data and to convey that position data to a remote computing device for review and/or analysis. There is a tradeoff between collecting too much data (cell phone bills are too high) and collecting too little data (value-added analytics cannot be achieved without sufficient data). The concepts disclosed herein relate to method and apparatus to enable the data collection/transmission paradigm of such a GSM/GPS device to be varied (or triggered) based on the detection of one or more predefined events. This enables data which can contribute to value added analytics to be acquired, without wasting airtime on less important data.

One paradigm for collecting and transmitting GPS data using a GSM/GPS device (or a separate GSM device coupled to a GPS, noting that the concepts disclosed herein can also be implemented using other forms of wireless data transfer, including but not limited to satellite) is to collect GPS data at predetermined intervals, or according to some algorithm that changes the vehicle position data collecting paradigm based on changes in vehicle speed or heading (such an algorithm can enable relatively more data to be collected during city driving versus traveling along a straight section of highway with little change in speed or heading). The concepts disclosed herein are based on modifying the frequency with which GPS data is collected and transmitted to a remote server, based on non-position related inputs received from the vehicle (i.e., not simply a change in speed or heading as in the above described algorithm). In an exemplary embodiment, those non-position related inputs are acquired from a vehicle data bus, such as a J1939, J1708, and/or CAN bus. In certain embodiments, those on non-position related inputs can be received from an OBD or OBD-II interface.

In at least one embodiment, an existing GPS data acquisition paradigm is modified when an amount of fuel passing through fuel injectors increases, such that a GPS data point is acquired when fuel use increases. In an exemplary embodiment, the data point includes fuel use data and GPS data. Such data will enable vehicle operators to understand at what vehicle locations their fuel usage increases.

In at least one embodiment, an existing GPS data acquisition paradigm is modified when an amount of fuel passing through fuel injectors decreases, such that a GPS data point is acquired when fuel use decreases. In an exemplary embodiment, the data point includes fuel use data and GPS data. Such data will enable vehicle operators to understand at what vehicle locations their fuel usage decrease.

While relating fuel use to fuel passing through injectors represents an exemplary technique for determining changes in fuel use that trigger collection of a GPS data point and fuel use data, it should be understood that other types of sensors related to fuel use can be similarly employed (such as a flow sensor in a fuel line). Any input providing insight into changes (decreases or increases) in fuel consumption can be used as an input.

In at least one embodiment, an existing GPS data acquisition paradigm is modified when a throttle position changes, such that a GPS data point is acquired when throttle position changes. In an exemplary embodiment, the data point includes throttle position and GPS data. Such data will enable vehicle operators to understand at what vehicle locations their throttle positions change.

In at least one embodiment, an existing GPS data acquisition paradigm is modified when engine, oil, coolant and/or brake temperatures change, such that a GPS data point is acquired when such temperature changes occur. In an exemplary embodiment, the data point includes temperature data and GPS data. Such data will enable vehicle operators to understand at what vehicle locations their vehicle system's temperatures change.

In at least one embodiment, an existing GPS data acquisition paradigm is modified when accessory devices such as fans are energized, such that a GPS data point is acquired when such accessory devices are used. In an exemplary embodiment, the data point includes the identity of the accessory device, any measured parasitic load, and GPS data. Such data will enable vehicle operators to understand at what vehicle locations the vehicle's parasitic loads increase, which generally relates to a decrease in fuel economy.

In at least one embodiment, an existing GPS data acquisition paradigm is modified when cruise control is turned on or off, such that a GPS data point is acquired when cruise control is turned on or off. In an exemplary embodiment, the data point includes the status of the cruise control unit and GPS data. Such data will enable vehicle operators to understand at what vehicle locations cruise control is and is not employed.

In at least one embodiment, an existing GPS data acquisition paradigm is modified when a driver changes gears, such that a GPS data point is acquired when such shifting occurs. In an exemplary embodiment, the data point includes the selected gear (RPM can also be collected if desired) and GPS data. Such data will enable vehicle operators to understand at what vehicle locations the driver shifts gears. Shifting patterns can have a measurable impact on fuel economy.

In at least one embodiment, an existing GPS data acquisition paradigm is modified when engine load changes, such that a GPS data point is acquired when such engine load changes. Engine load is not simply RPM, and many vehicle ECU units are configured to calculate engine load. In an exemplary embodiment, the data point includes the engine load and GPS data. Such data will enable vehicle operators to understand at what vehicle locations the engine loads increase or decrease.

In at least one embodiment, inclinometers, accelerometers, or hard braking sensors are used to similarly change an existing GPS data acquisition paradigm.

In at least one embodiment, an existing GPS data acquisition paradigm is modified when engine RPM changes, such that a GPS data point is acquired when engine RPM increases or decreases. In an exemplary embodiment, the data point includes RPM data and GPS data. Such data will enable vehicle operators to understand at what vehicle locations their RPMs change. It should be understood that limits can be placed on how much the engine RPMs need to vary to trigger a change. For example, some operators may wish to track RMP changes of about 10% or more, while other operators may wish to track RPM changes of about 50 or more RPMs. It should be recognized that such RPM changes are intended to be exemplary, and not limiting. Further, with respect to that other non-position based event changes disclosed herein (i.e., fuel use, temperature, throttle position, etc.), it should be recognized that changing an existing GPS data acquisition paradigm can be based on any change in the specific parameter, or a certain magnitude of a change in that parameter. Further, the concepts disclosed herein encompass embodiments where the magnitude of the change needed to trigger modification of an existing GPS data acquisition paradigm can itself be modified (i.e., the magnitude can be modified). The concepts disclosed herein encompass embodiments where the magnitude of the change triggering the modification of the existing GPS data acquisition paradigm can be modified by users; such that users can reprogram the logic controlling the GPS data acquisition paradigm to modify the magnitude parameters of non-position based events that trigger a change in the existing GPS data acquisition paradigm.

In addition to being implemented as a method, the concepts disclosed herein can also be implemented as a memory medium, storing machine instructions that when executed by a processor implement the method, and by a system for implementing the method. In such a system, the basic elements include a vehicle that is to be operated by a vehicle operator, data collection components in the vehicle (sensors/controllers for determining parameters such as fuel use, temperature, RMP, load, shifting patterns, throttle position, use of accessory components, use of cruise control, etc.), and a geographical position tracking unit (such as a GPS tracking device), a processor for combining the different data types into time indexed parameter (fuel use, temperature, RMP, load, shifting patterns, throttle position, use of accessory components, use of cruise control, etc.) encoded position data (such a processor could be part of the GPS unit), a data link (which in an exemplary embodiment is integrated into the GPS unit as a wireless data link), and a remote computing device. In general, the remote computing device can be implemented by a computing system employed by an entity operating a fleet of vehicles. Entities that operate vehicle fleets can thus use such computing systems to track and process data relating to their vehicle fleet. It should be recognized that these basic elements can be combined in many different configurations to achieve the exemplary method discussed above. Thus, the details provided herein are intended to be exemplary and not limiting on the scope of the concepts disclosed herein.

The above noted method is preferably implemented by a processor (such as computing device implementing machine instructions to implement the specific functions noted above) or a custom circuit (such as an application specific integrated circuit).

Other concepts that can be combined with the modification of a GPS data collection paradigm include the following. A method of combining fuel use data collected by a vehicle's fuel injector with position data collected during operation of the vehicle, to generate fuel use encoded position data. Such fuel use encoded position data preferably is four dimensional: position (latitude & longitude), time, fuel injector data, and odometer data. Generating such data requires the vehicle to be equipped with a position sensing system (able to determine the vehicle's latitude & longitude per unit of time), and a sensor incorporated into at least one fuel injection component, to enable an amount of fuel introduced into the vehicle's engine to be determined per unit of time. Diesel engines that include fuel injectors configured to collect information about the flow of fuel through the injectors per unit time are currently available. In an exemplary, but not limiting embodiment, the odometer data is collected from the vehicle computer using a J-1708 or J-1939 bus. While including the odometer data is likely to be popular with end users, it should be understood that the concepts disclosed herein also encompass embodiments in which the odometer data is not included in the fuel use encoded position data.

Such fuel use encoded position data has a number of uses. The data can be used to determine fuel usage of the vehicle under many different search parameters. For example, many commercial trucks are used both on and off road. Diesel fuel for highway use is taxed at a much higher rate than diesel fuel for non-highway use (diesel for off road use is generally exempt from Federal and State road taxes). The fuel use encoded position data can be used to calculate how much diesel fuel is consumed when the vehicle is not on the highway (i.e., when the lower tax rate applies). Normally this metric is calculated using an average MPG. If the off-road trip was 20 miles round trip and the vehicle MPG averages 10 MPG, then 2 gallons of diesel were assumed to be used. That calculation is very error prone. Off road fuel consumption is often higher for a number of reasons. Road condition is poorer, so fuel consumption generally is higher. Many commercial vehicles going off road are maintenance vehicles equipped with power take off units, which use engine power to do mechanical work other than driving road wheels. Thus, even when the vehicle is not moving, the engine is often consuming fuel to power ancillary equipment. A mileage based calculation will not take into account the fuel consumed off road when the vehicle is stationary, but consuming fuel to power equipment.

The fuel use encoded position data can also be used to evaluate the mechanical condition of a vehicle. Assume a vehicle travels from point A to point B consistently. By monitoring fuel use for that trip over a period of time, a decrease in fuel efficiency may indicate a mechanical problem (dirty injectors, fouled spark plugs, etc.).

Yet another use for the fuel use encoded position data is to provide a data set to be used to analyze fuel consumption relative to elevation change. By quantifying how much fuel is consumed traveling over a route with elevation changes, one can identify alternate, possibly longer routes, that are more fuel efficient, due to fewer elevation changes. A related use for the fuel use encoded position data is to provide a data set to be used to analyze fuel consumption relative to road surface. Analyzing fuel consumption relative to the type of road surface will enable vehicle operators to learn what road type surfaces are associated with lower fuel consumption. Regularly traveled routes can then be analyzed to determine if an alternate route over different road surfaces could lead to lower fuel consumption. Correlating the fuel use encoded position data with vehicle loading data can also facilitate analysis of fuel consumption not only based on elevation and road surface, but vehicle loading as well.

It should be recognized that one aspect of the concepts disclosed herein is a method for generating fuel use encoded position data by combining fuel usage data (per unit of time) collected by fuel injectors with position data (per unit of time). Another aspect of the concepts disclosed herein is a method for collecting fuel use encoded position data at a remote computer, by wirelessly transmitting the fuel use encoded position data from the vehicle to a remote computer in real-time. The term real-time is not intended to imply the data is transmitted instantaneously, rather the data is collected over a relatively short period of time (over a period of seconds or minutes), and transmitted to the remote computing device on an ongoing basis, as opposed to storing the data at the vehicle for an extended period of time (hour or days), and transmitting an extended data set to the remote computing device after the data set has been collected. Transmitting fuel use encoded position data at a later time, rather than in real time, is encompassed by the concepts disclosed herein, although real-time data transmission is likely to be popular with users.

Another aspect of the concepts disclosed herein is a method for using fuel use encoded position data to calculate fuel use taxes. While the fuel tax calculations could be performed by a processer in the vehicle, in a preferred but not limiting embodiment, the fuel use encoded position data will be transferred to the remote computing device for storage, such that the fuel use encoded position data for a particular vehicle can be accessed at a later time to perform the fuel tax calculations. It should be understood that the term remote computer and the term remote computing device are intended to encompass networked computers, including servers and clients, in private networks or as part of the Internet. The fuel use encoded position data can be stored by one element in such a network, retrieved for review by another element in the network, and analyzed by yet another element in the network. In at least one embodiment, a vendor is responsible for storing the data, and clients of the vendor are able to access and manipulate the fuel use encoded position data.

Still another aspect of the concepts disclosed herein is a method for using fuel use encoded position data to diagnose a relative mechanical condition of a vehicle that repetitively travels a specific route. Fuel use encoded position data for different trips can be compared. Changes in fuel use encoded position data can indicate that a fuel efficiency of the vehicle has decreased over time, indicating that the vehicle should be inspected for mechanical conditions (such as dirty fuel filter, dirty air filters, and/or clogged fuel injectors, noting that such examples are not intended to be limiting) that may be contributing to a reduction in fuel efficiency.

Still another aspect of the concepts disclosed herein is a method for enabling a user to define specific parameters to be used to analyze such fuel use encoded position data. In an exemplary embodiment, a user can define a geographical parameter, and analyze the fuel use encoded position data in terms of the user defined geographical parameter. In an exemplary embodiment, the geographical parameter is a geofence, which can be generated by displaying a map to a user and enabling the user to define a perimeter "fence" around any portion of the map. Having defined the geofence, the user can then analyze the fuel use encoded position data for the vehicle, such that only the portion of the fuel use encoded position data whose geographical/position data falls within the confines of the geofence is included in the analysis. One such analysis can be fuel tax calculations, where the geofence is used to define off road vehicular use. Another such analysis can determine how fuel use patterns change over time, where the geofence is used to define a specific route (such as a bus route or an invariant delivery route). In another exemplary embodiment, the geographical parameter is a set of geographical coordinates. As discussed above, some vehicles regularly travel a predefined route, and the predefined route can be defined by a set of geographical coordinates that the vehicle encounters whenever transiting that route. A larger data set will include more geographical coordinates. A relatively larger set of geographical coordinates will be generated if the set of geographical coordinates includes individual geographical coordinates separated from one another by 25 feet. A relatively smaller set of geographical coordinates will be generated if the set of geographical coordinates includes individual geographical coordinates from each intersection at which the vehicle makes a turn or change in direction (such that geographical coordinates defining where the vehicle enters and exits a relatively long street can be separated from one another by relatively long distances). Such a set of geographical coordinates can be considered to define a fingerprint for a specific route. An exemplary analysis of fuel use encoded position data where the geographical parameter is a route fingerprint is to determine how fuel use patterns change over time as the route is completed at different times. Changes in fuel use patterns can indicate that a fuel efficiency of the vehicle has decreased over time, indicating that the vehicle should be inspected for mechanical conditions, generally as discussed above.

In addition to being implemented as a method, the concepts disclosed herein can also be implemented as a memory medium, storing machine instructions that when executed by a processor implement the method, and by a system for implementing the method. In such a system, the basic elements include a vehicle that is to be operated by a vehicle operator, data collection components in the vehicle (injectors that collect fuel use data per unit time, and a geographical position tracking unit, such as a GPS tracking device), a processor for combining the different data types into time indexed fuel use encoded position data (such a processor could be part of the GPS unit), a data link (which in an exemplary embodiment is integrated into the GPS unit as a wireless data link), and a remote computing device. In general, the remote computing device can be implemented by a computing system employed by an entity operating a fleet of vehicles. Entities that operate vehicle fleets can thus use such computing systems to track and process data relating to their vehicle fleet. It should be recognized that these basic elements can be combined in many different configurations to achieve the exemplary method discussed above. Thus, the details provided herein are intended to be exemplary and not limiting on the scope of the concepts disclosed herein.

The above noted method is preferably implemented by a processor (such as computing device implementing machine instructions to implement the specific functions noted above) or a custom circuit (such as an application specific integrated circuit).

In a further aspect, the present invention may take the form of a geographical position system for use in a vehicle, the geographical position system comprising a positioning sensing component for collecting geographical position data from the vehicle during vehicle operation, the geographical position data being time indexed. Also, there is a first data port for receiving non-position related parameter data from the vehicle during operation of the vehicle, the non-position related parameter data being time indexed to correlate the non-position related parameter data to a specific point in time, the non-position related parameter comprising at least one of fuel use, engine RPM, engine load, temperature, cruise control status, and accessory device status. Also, a processor implements the functions of triggering the logging of geographical position data according to a predefined paradigm; and triggering the logging of non-position related parameter data and position and geographical position data based on the detection of an event associated the non-position related parameter data. Finally, a data link conveys the non-position related parameter data and the geographical position data to a remote computing device. In this system the data link may comprise a wireless data link. Also, the processor may be configured to combine the parameter data and the geographical position data together at the vehicle to produce parameter encoded position data.

In a yet further aspect, the present invention may take the form of a method for generating non-position parameter encoded position data from a vehicle equipped with a geographical position system. The method includes collecting geographical position data from the vehicle during vehicle operation according to a defined logging paradigm, the geographical position data being time indexed. Then, there is a determination if whether a predefined parameter is present during vehicle operation. The predefined parameter comprises at least one of the following: any change in engine RPM; a change in engine RPM over a predetermined magnitude; any change in engine load; a change in engine load over a predetermined magnitude; any change in oil temperature; a change in oil temperature over a predetermined magnitude; any change in coolant temperature; and a change in coolant temperature over a predetermined magnitude. In response to detecting the predefined parameter during vehicle operation, the defined logging paradigm is modified to collect additional geographical position data at the time the predefined parameter is detected. Finally, data corresponding to the predefined parameter detected, is collected.

In a still further aspect, the present invention may take the form of a method for generating non-position parameter encoded position data from a vehicle equipped with a geographical position system. The method includes collecting geographical position data from the vehicle during vehicle operation according to a defined logging paradigm, the geographical position data being time indexed. Then, there is a determination of whether a predefined parameter is present during vehicle operation. The predefined parameter includes at least one of the following: any change in brake temperature; and a change in brake temperature over a predetermined magnitude. In response to detecting the predefined parameter during vehicle operation, modifying the defined logging paradigm to collect additional geographical position data at the time the predefined parameter is detected, and collecting data corresponding to the predefined parameter detected.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a high-level logic diagram showing exemplary overall method steps implemented in accord with the concepts disclosed herein to combine fuel use data collected from a fuel injector with geographical position data collected while a vehicle is in operation, to generate fuel use encoded position data, which can be subsequently analyzed to determine at least one operational parameter of the vehicle;

Figure 1:
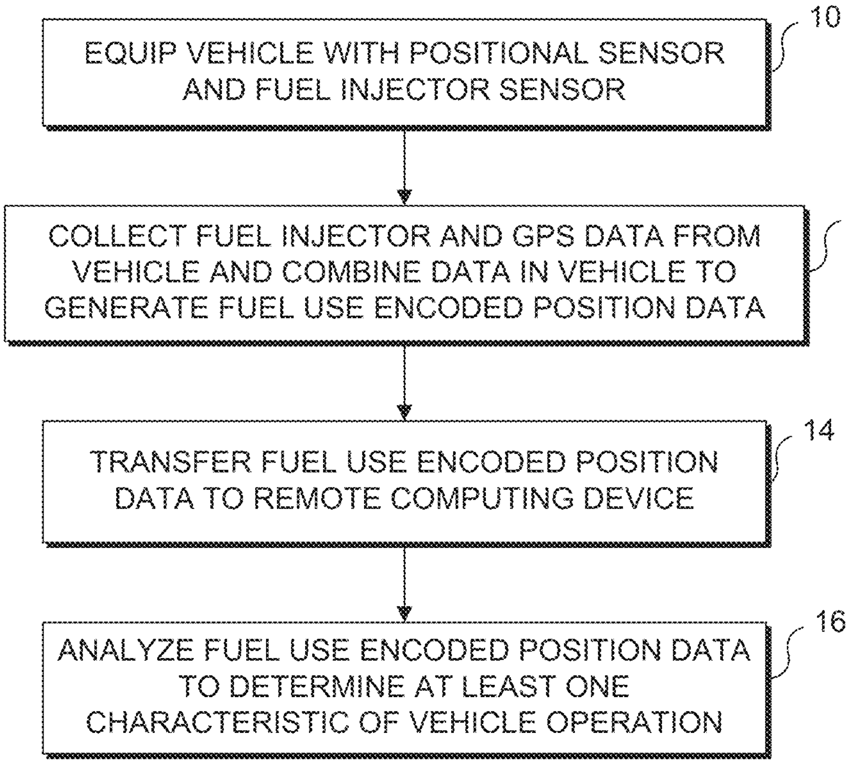
Figure 9:
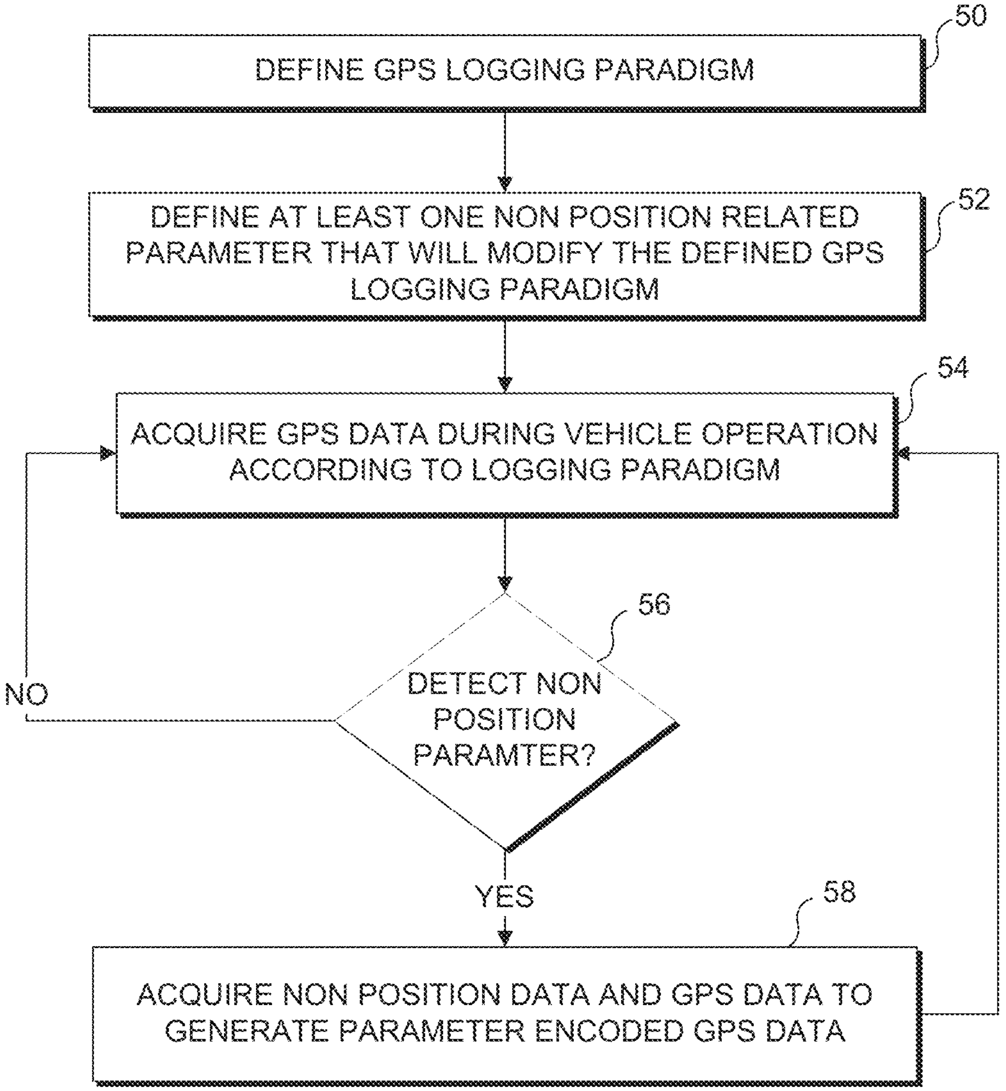
FIG. 9 is a flow chart showing exemplary method steps implemented to modify a GPS logging paradigm based on the detection of one or more non-position related parameters.
Figure 10A:
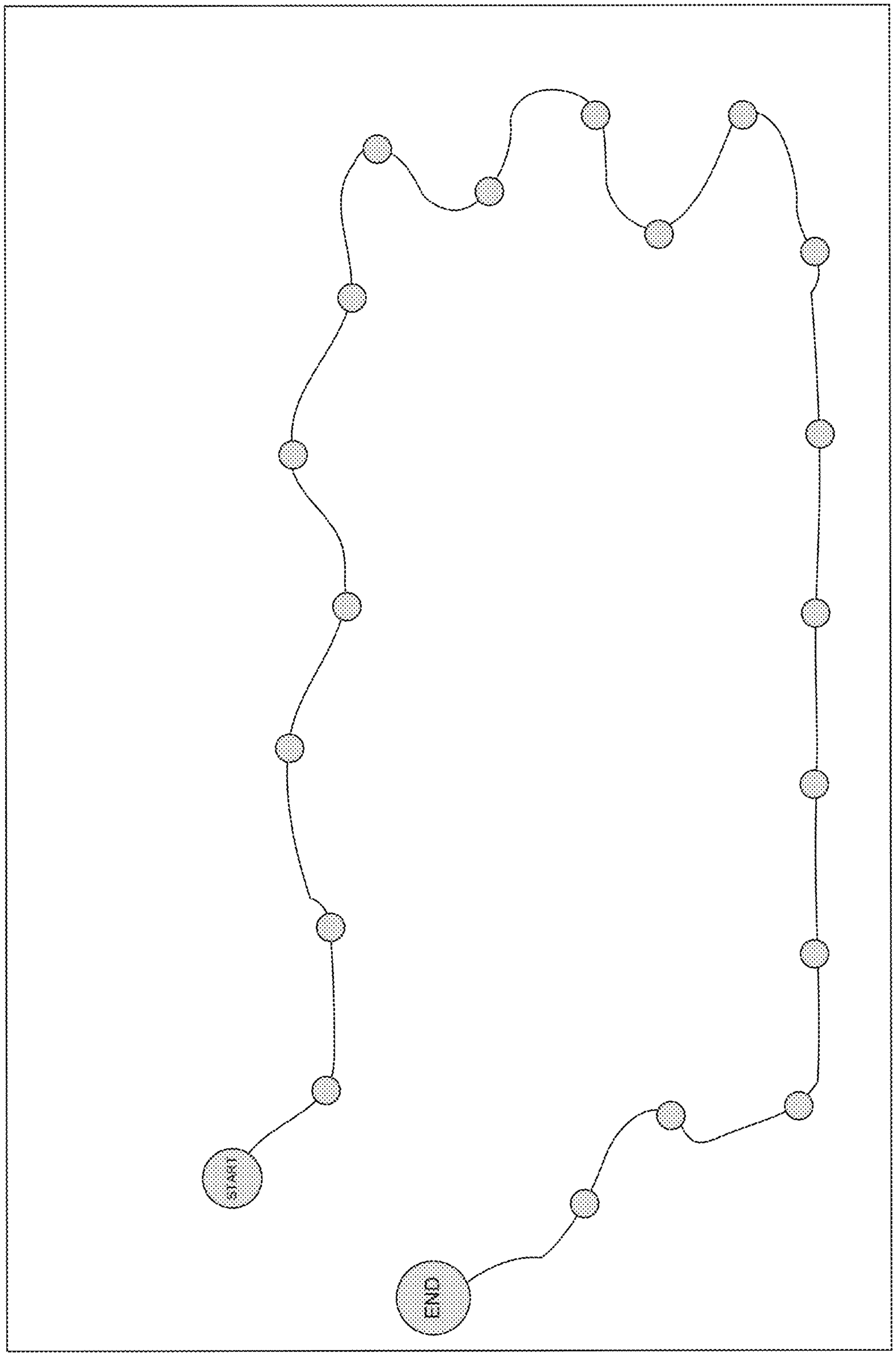
Figure 10B:
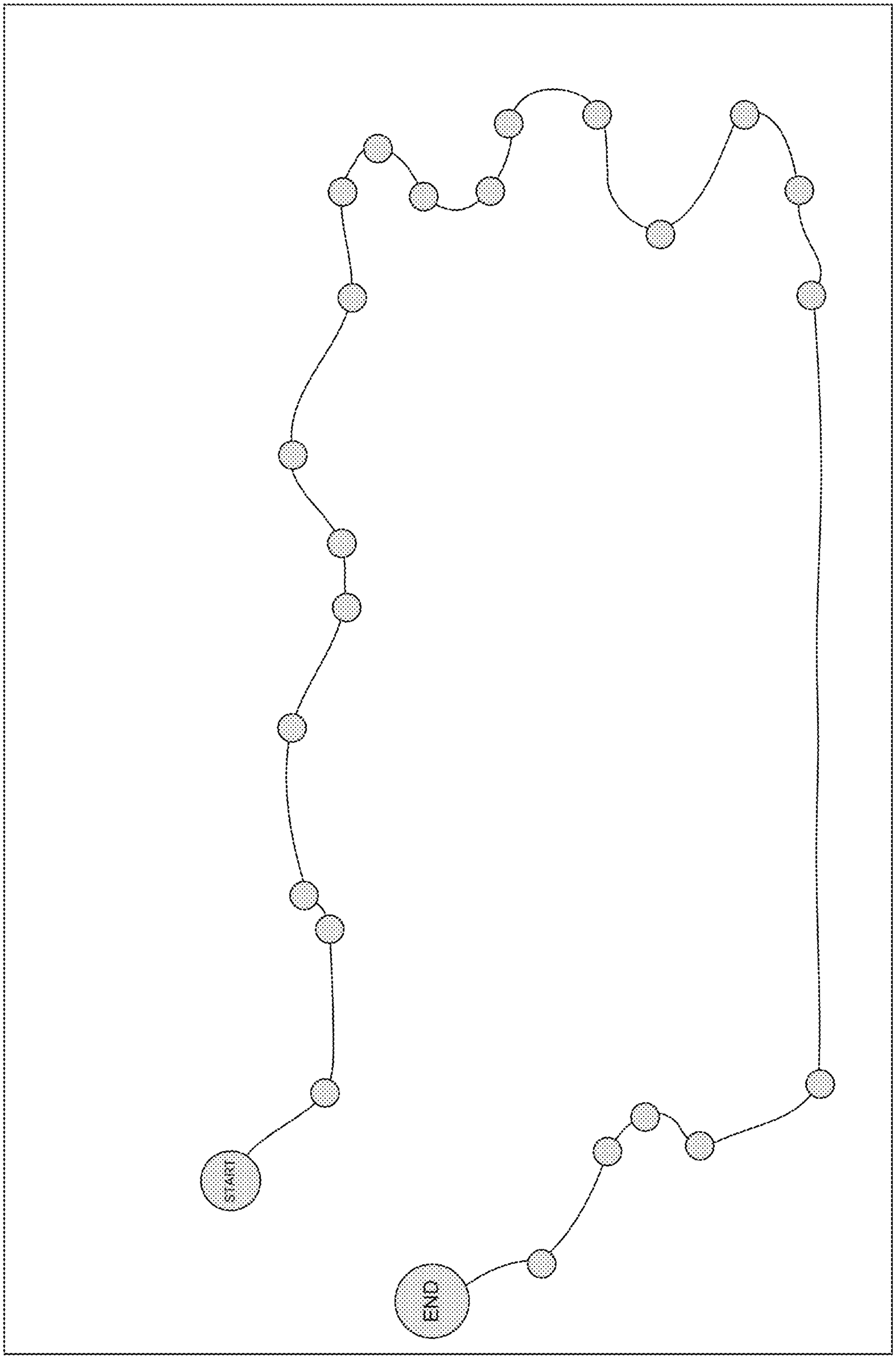
Figure 10C:
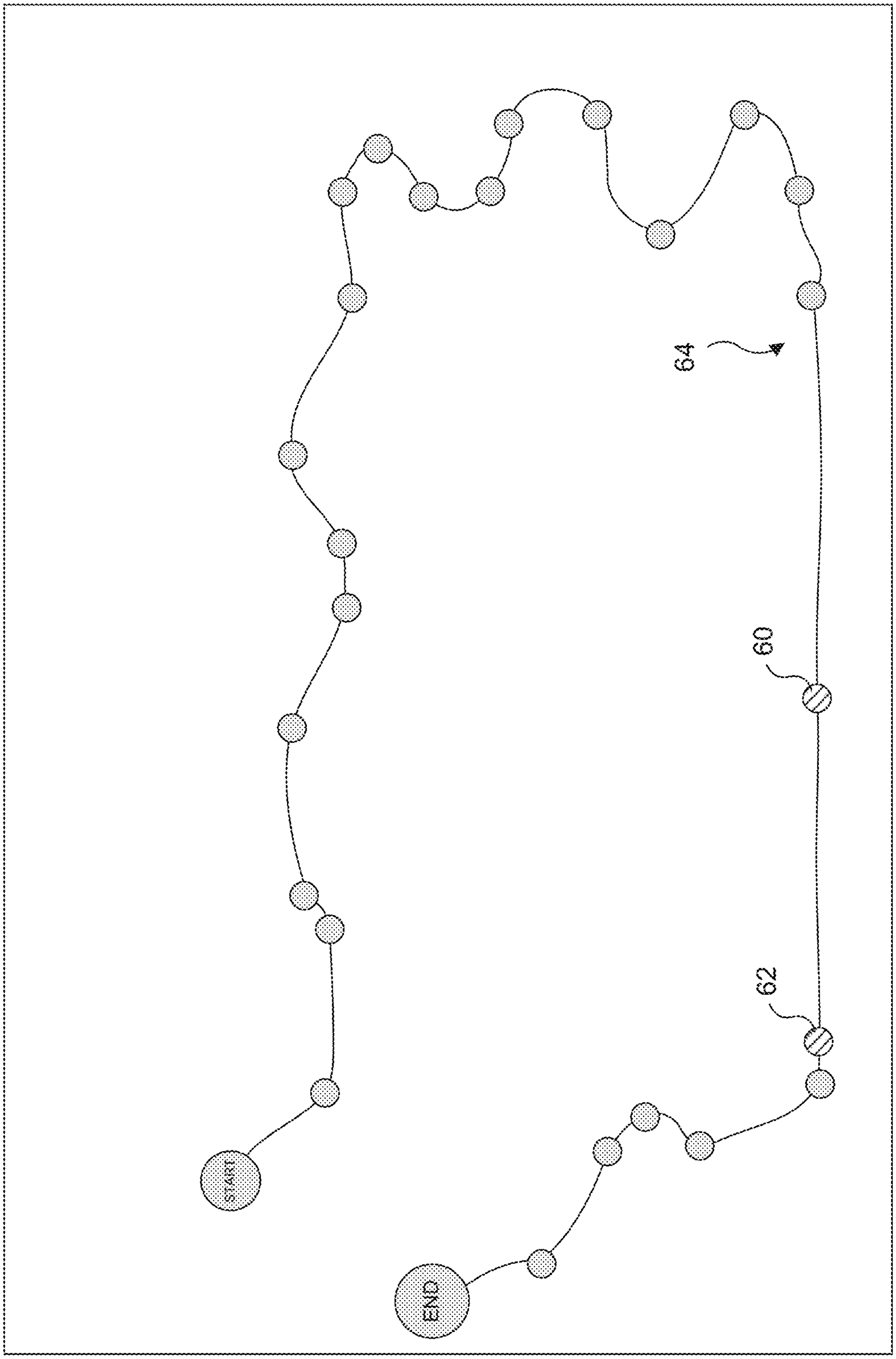
Figure 11:
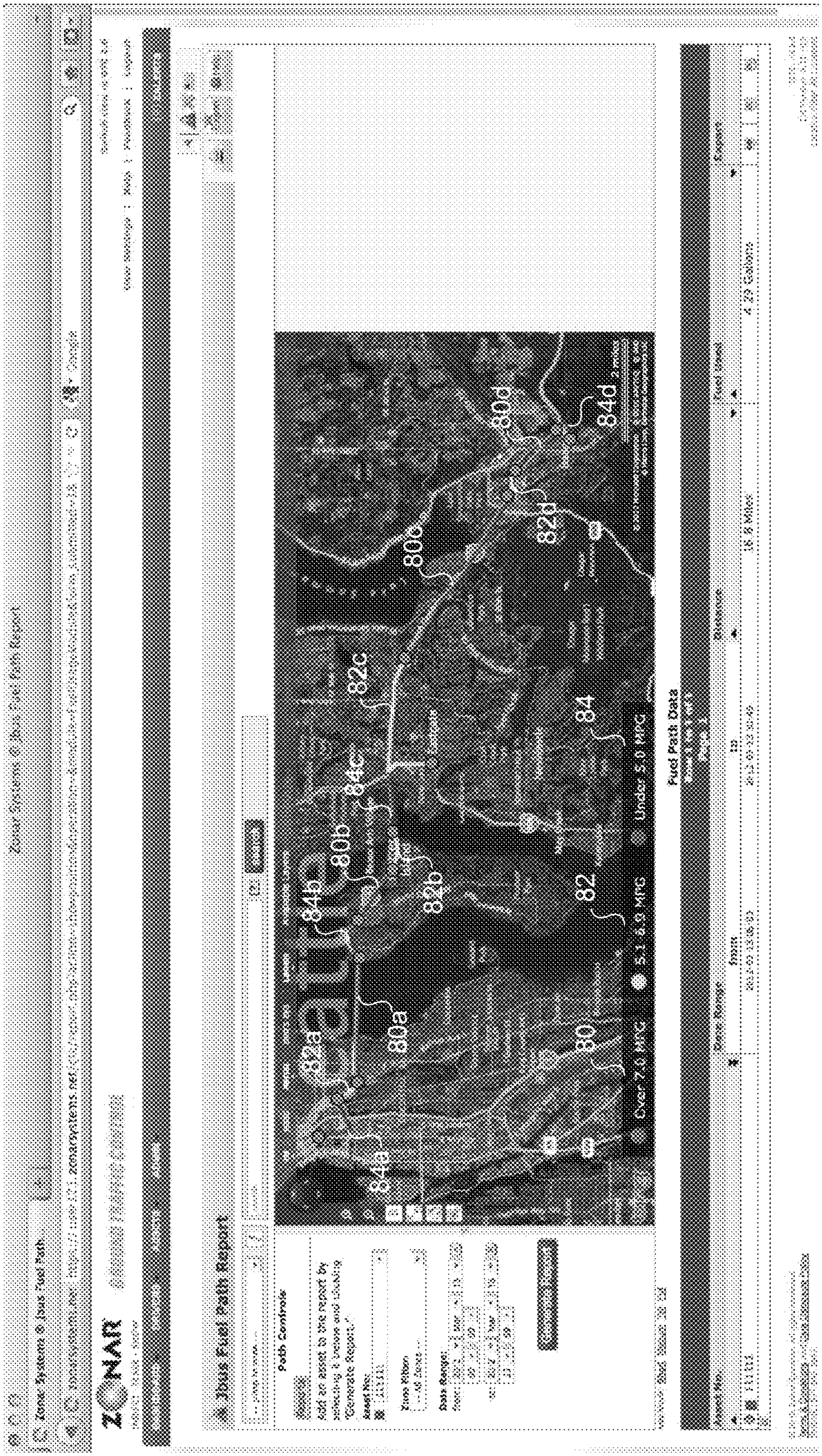
Figure 12:
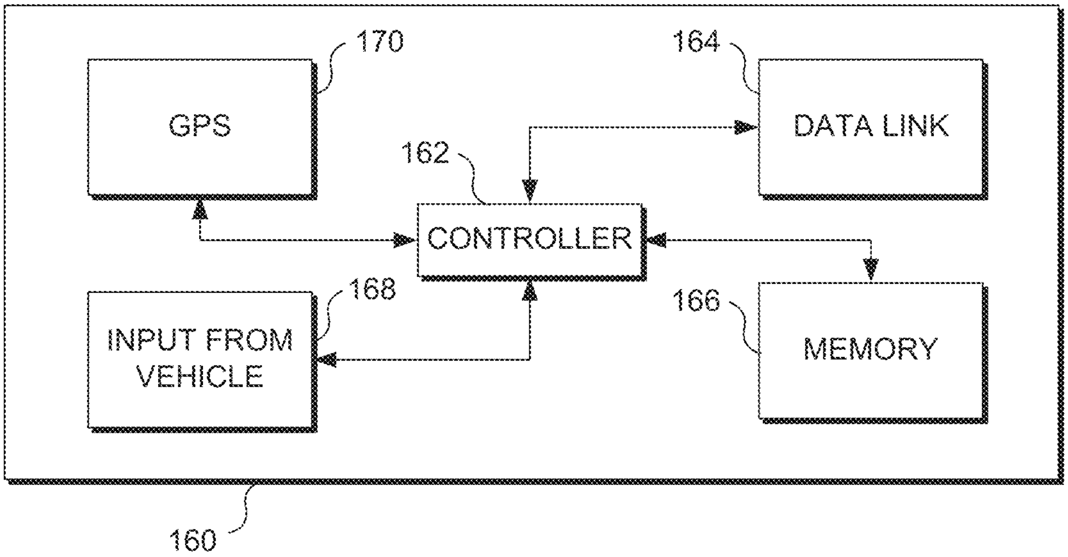

FIG. 10A schematically illustrates a GPS logging paradigm based on GPS logging at predetermined time intervals;

FIG. 10B schematically illustrates a GPS logging paradigm based on GPS logging at predetermined time intervals modified based on position based parameters;

FIG. 10C schematically illustrates the GPS logging paradigm of FIG. 10B modified based on detecting a non-position based parameter;

FIG. 11 is a screen shot of a web page upon which a vehicle owner can view fuel use data overlaid upon vehicle route data, where the fuel use data was collected using the method of FIG. 9; and FIG. 12 is a functional block diagram of an exemplary telematics device added to an enrolled vehicle to implement one or more of the methods of FIGS. 1 and 9.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive. Further, it should be understood that any feature of one embodiment disclosed herein can be combined with one or more features of any other embodiment that is disclosed, unless otherwise indicated.

Newly Disclosed Subject Matter

The concepts disclosed herein relate to both newly disclosed subject matter and previously disclosed subject matter. The previously disclosed subject matter provides contextual information that is relevant to the new disclosure, hence it inclusion. The newly disclosed subject matter begins with FIG. 9.

Related Subject Matter Disclosed in U.S. patent application Ser. No. 12/836,487

As used herein and in the claims that follow, the term off road is intended to refer to use of a vehicle where fuel consumed by that vehicle should be assessed a tax using a tax rate different than fuel consumed by the same vehicle when traveling over a public highway. The concepts disclosed herein can help vehicle operators more As used herein and in the claims that follow, the term route is intended to refer to a route between a starting location and an ending location that is intended to be traversed a plurality of times. For example, bus operators generally operate buses on a number of different specific routes, which are generally differentiated by a route number. A bus Route 51 might connect a shopping mall and an airport, while a bus Route 52 might connect the airport to a university. Route 51 and Route 52 are each different routes. A route may include one or more intermediate locations disposed between the starting location and the ending location, such intermediate locations representing geographical locations that the route intersects. Each route can be defined by a plurality of geographical coordinates through which a vehicle will pass when traversing the route. As such, a set of position data collected during the operation of a vehicle can be used to define a route.

FIG. 1 is a high-level flow chart showing the overall method steps implemented in accord with one aspect of the concepts disclosed herein, to collect fuel use data from a fuel injector sensor and position data, then combine the data to generate fuel use encoded position data, which can be analyzed to determine at least one operating characteristic of the vehicle. In a block 10, a vehicle is equipped with geographical position sensors (such as a GPS unit), so that geographical position data can be collected when the vehicle is being operated, and a fuel injector that measures a quantity of fuel flowing through the fuel injector. Mercedes Benz manufactures diesel engines that incorporate fuel injectors capable of providing such fuel use data. Other vendors will likely offer engines having similar functionality. In general, each fuel injector in the vehicle will include such a fuel sensor. However, it should be recognized that less than all of the fuel injectors can include such sensors, so long as the data for the engine's fuel use is adjusted to compensate (i.e., an engine with four injectors, only one of which includes a fuel sensor, should have its measured fuel use increased fourfold to account for fuel flow through the unmonitored injectors). In an exemplary but not limiting embodiment, fuel injector data is collected from the vehicle computer using either a J-1708 or J-1939 bus. The data values are generally in English unit using the J-1708 bus and metric units using the J-1939 bus. The J-1939 bus provides fuel injector data with ½ liter resolution. In general, the vehicle computer will receive from usage data from each cylinder's fuel injector. It would be possible to collect fuel use data from only a single injector in a multi-cylinder engine, and then increase that data by a factor corresponding to the number of cylinders. Similarly, data could be collected from ½ of the injectors, and then doubled to normalize the data for fuel use in all cylinders.

In a block 12, the vehicle is operated while collecting both GPS data (i.e., position data, preferably including time indexed longitude and latitude data) and fuel use data (as measured through the fuel injectors). The different types of data are combined into a time indexed data set. In an exemplary embodiment, the different types of data (position and fuel use) are combined by a geographical position sensing system, an exemplary implementation of which is discussed in detail below to generate fuel use encoded position data.

In a block 14, the fuel use encoded position data collected during operation of the vehicle is conveyed to a remote computing device. In one exemplary, but not limiting embodiment, the fuel use encoded position data is wirelessly transmitted to the remote computing device on the fly (i.e., as the information is generated). In such an embodiment, it may be desirable to store a copy of the fuel use encoded position data at the vehicle in case of a failure in the transmission of the data stream. In another exemplary embodiment, the fuel use encoded position data is stored in the vehicle and conveyed to the remote computing device at a later time.

In a block 16, the fuel use encoded position data conveyed to the remote computing device is analyzed to determine at least one operational characteristic of the vehicle. The fuel use encoded position data can be used to determine fuel usage of the vehicle under many different search parameters. In a first exemplary embodiment, the fuel use encoded position data is used to calculate the correct fuel tax for the vehicle, based on an analysis of where the vehicle was located during fuel use. Commercial trucks are often used both on and off road. Diesel fuel for highway use is taxed at a much higher rate than diesel fuel for non-highway use. In this embodiment, the fuel use encoded position data is used to calculate how much diesel fuel is consumed when the vehicle is not on the highway (i.e., when the lower tax rate applies). Simple average MPG estimates are error prone, as off-road fuel consumption is often higher that highway fuel consumption (road condition is poorer, and off-road vehicle use frequently includes using engine power to do mechanical work other than driving road wheels). It should also be recognized that the fuel use encoded position data can also be used to determine how much fuel is used on public roadways (where the fuel use tax is higher), and to determine the off-road fuel use by subtracting the fuel used on public roadways from the total fuel use to determine the off-road fuel use.

In a second exemplary embodiment, the fuel use encoded position data is used to determine how much fuel is used consumed during idle time (such as when a vehicle is parked and the engine is not shut off). Fleet operators want to reduce idle time, as idle time wastes fuel and increases costs. Fuel use during idle time can be calculated in a number of ways. Certain geographical positions (fleet yards, truck stops, loading and unloading points) can be designated for review, such that fuel use from the fuel use encoded position data is extracted for the designated geographical positions, and used to determine how much fuel is consumed at those locations. Alternatively, the fuel use encoded position data can be analyzed to determine how much fuel is consumed when the vehicle is on but its position remains the same (this latter technique is over-inclusive, as it may include fuel use required to power equipment needed while the vehicle is stationary, as well as fuel use while the vehicle is stopped for traffic and shutting down the vehicle is not practical). The over inclusiveness of the latter technique can be managed by eliminating geographical positions where fuel was used to power equipment, or geographical positions where fuel was used while sitting in traffic.

In a third exemplary embodiment, the fuel use encoded position data is used to evaluate (or to monitor) changes in fuel use patterns for a vehicle regularly traveling the same route. Changes in such fuel use patterns can be indicative of mechanical problems, such that when such changes are identified, it may be prudent to schedule maintenance for the vehicle. Assume a vehicle travels from point A to point B consistently. By monitoring fuel use for that trip over a period of time, a decrease in fuel efficiency may indicate a mechanical problem (dirty injectors, fouled spark plugs, etc). Of course, such fuel use changes may be attributable to other conditions, such as changes in traffic patterns (heavy traffic encountered during one trip will increase fuel use) or changes in vehicle loading (a trip with a heavy load will likely consume more fuel than a trip for a light load). Historical traffic data and loading data can be used to more clearly target fuel use pattern changes likely to be correlated to mechanical condition.

Figure 2:
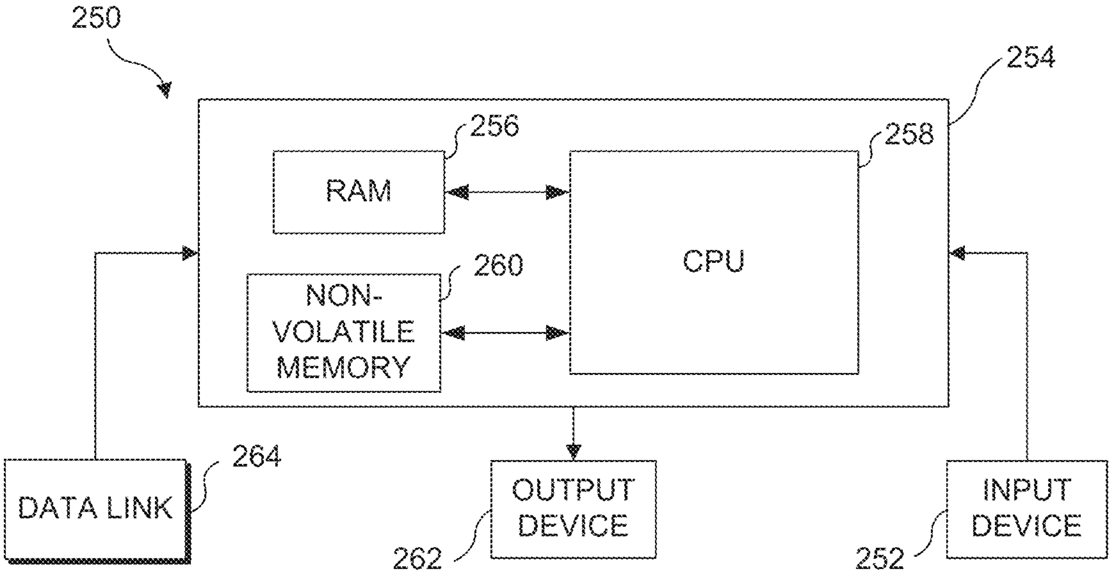
FIG. 2 is a functional block diagram of an exemplary computing device that can be employed to implement some of the method steps disclosed herein.

In general, analysis of the fuel use encoded position data will be carried out by a remote computing device. The remote computing device in at least one embodiment comprises a computing system controlled or accessed by the fleet operator. The remote computing device can be operating in a networked environment, and in some cases, may be operated by a third party under contract with the fleet operator to perform such services. FIG. 2 schematically illustrates an exemplary computing system 250 suitable for use in implementing the method of FIG. 1 (i.e., for executing block 18 of FIG. 1). Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of fuel use encoded position data collected in connection with operation of the vehicle to determine at least one operating characteristic of the vehicle. The machine instructions implement functions generally consistent with those described above with respect to block 16 of FIG. 1, as well as those described below in blocks 30-38, with respect to FIG. 6. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well-known in the art. Machine instructions and data are temporarily loaded into RAM 256 from non-volatile memory 260. Also stored in the non-volatile memory are an operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to compare subsequently collected actual route data with optimal route data, to identify any deviations and/or efficiency improvements). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. Data link 264 is configured to enable data collected in connection with operation of a vehicle to be input into computing system 250 for subsequent analysis. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

It should be understood that the term remote computer and the term remote computing device are intended to encompass networked computers, including servers and clients, in private networks or as part of the Internet. The fuel use encoded data can be stored by one element in such a network, retrieved for review by another element in the network, and analyzed by yet another element in the network. In at least one embodiment, a vendor is responsible for storing the data, and clients of the vendor are able to access and manipulate the data. While implementation of the method noted above has been discussed in terms of execution of machine instructions by a processor (i.e., the computing device implementing machine instructions to implement the specific functions noted above), the method could also be implemented using a custom circuit (such as an application specific integrated circuit).

Figure 3:
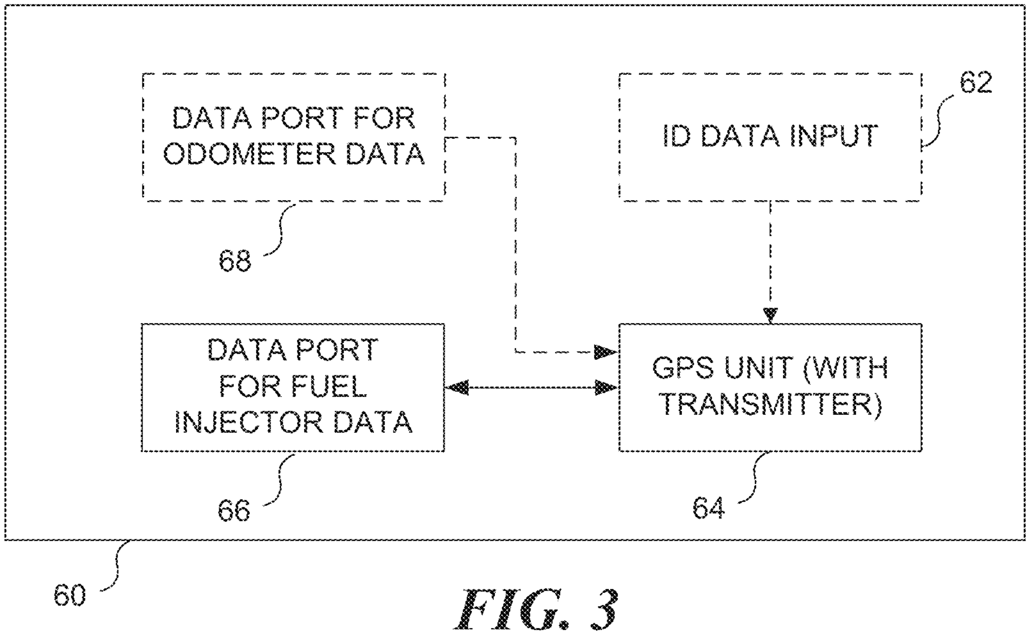
FIG. 3 is a functional block diagram of an exemplary geographical position sensing system employed to implement some of the concepts disclosed herein.

FIG. 3 is a functional block diagram of an exemplary geographical position sensing system employed to implement some of the concepts disclosed herein. A position sensing system 60 includes a GPS component 64 (which, in this embodiment, includes a transmitter, although it should be recognized that a GPS unit without a transmitter can be coupled with a transmitter or other data link to achieve similar functionality). Position sensing system 60 optionally includes a data port 68 coupled to the vehicle's odometer (or to the vehicle's on-board computer), so that odometer data can be collected and combined with the fuel use encoded position data. Position sensing system 60 includes a data port 66 coupled to the vehicle's fuel injectors (any fuel injector that includes a fuel use sensor; noting that data port 66 can also be coupled to the vehicle's on-board computer, such that the sensor data from the fuel injectors is first directed to the on-board computer, and then to position sensing system 60). GPS component 64 includes a processor that combines GPS data, fuel use data from the fuel injector sensor(s), and if desired, odometer data, to generate fuel use encoded position data that is time indexed (i.e., such that for a given point in time, one can determine the vehicle's position, the vehicle's fuel use, and optionally the vehicle's odometer reading). In a related embodiment, position sensing system 60 includes a processor separate and distinct from any processor in the GPS unit, such that the separate processor performs the function of combining the GPS data, the fuel use data, and optionally the odometer data. Such a processor can be implemented by a general purpose processor implementing specific machine instructions to execute the intended function, or custom hardware circuit configured to execute the intended function. While odometer data, fuel use data, and position data each could be collected at a different frequencies (i.e., at different times), and combined together to generate the fuel use encoded position data, in an exemplary and preferred embodiment, the odometer data, fuel use data, and position data are collected at the same time, so the time indexing of each data type matches. By collecting the different data types at the same time, one can ensure that the amount fuel use attributed to off road use is as accurate as possible. Note both the fuel use data and the odometer data normally collected by the vehicle are accumulated numerical values, and to record a specific data point one reads those accumulated values and combines them with the time and position data. The purpose of collecting the odometer data is to facilitate calculation of off road fuel use. As noted above, the concepts disclosed herein also encompass embodiments in which the odometer data is not included in the fuel use encoded position data.

If desired, position sensing system 60 can include an ID data input 62 that is used to uniquely identify the vehicle, so that the fuel use encoded position data can be uniquely correlated to a specific vehicle (fleet operators will want to be able to uniquely identify fuel use encoded position data from different fleet vehicles). In one embodiment, ID data input 62 comprises a keyboard or function keys logically coupled to GPS component 64 (or to the separate processor noted above, if implemented). It should be recognized, however, that other data input structures (i.e., structures other than keyboards) can instead be implemented, and that the concepts disclosed herein are not limited to any specific identification data input device. It should also be recognized that GPS component 64 can be configured to include in the GPS data (or in the fuel use encoded position data) a data component that can be used to uniquely correlate fuel use encoded position data with a specific vehicle, such that ID data input 62 is not required. The inclusion of ID data input 62 facilitates the addition of other types of data (such as inspection data) in the fuel use encoded position data.

Figure 4:
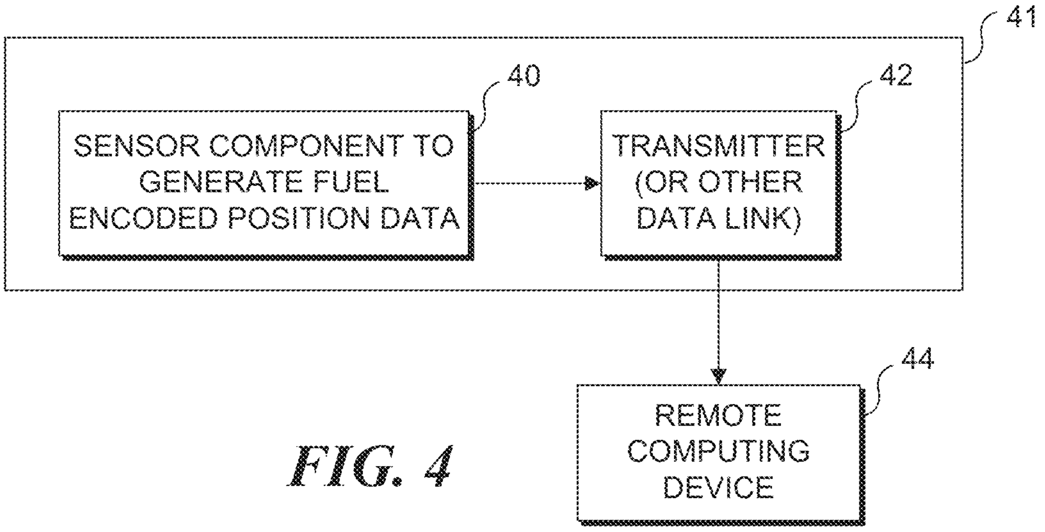
FIG. 4 is an exemplary functional block diagram showing the basic functional components used to implement the method steps of FIG. 1.

FIG. 4 is a functional block diagram of an exemplary system that can be employed to implement the method steps of FIG. 1. The components include a sensor component 40, a transmitter 42, which may also have a corresponding receiver—not shown (or other data link), and a remote computing device 44 (generally as described above). Sensor component 40 includes each element needed to collect the data elements included in the fuel use encoded position data, and a processing element required to combine the different types of sensor data together to generate time indexed fuel use encoded position data. The sensor elements include at least one fuel injector sensor to determine a quantity of fuel passing through an engine fuel injector (noting that each fuel injector in the engine can include the required sensor, or less than all fuel injectors in the engine can include such sensors, so long as the appropriate adjustment is made to the fuel use data to account for injectors that do not include sensors, generally as discussed above). Other types of data from other sensors can also be included in the fuel use encoded position data, including but not being limited to odometer data. As discussed above, the processor for combining the different data types into time indexed fuel use encoded position data can be a separate component or a processor included in a GPS component. Further, it should be recognized that many GPS units are available that already incorporate a transmitter, such that separate transmitter 42 may not be required. It should be understood that the concepts disclosed herein can be used with other types of geographical position sensors/systems, and the use of the term GPS is intended to be exemplary, rather than limiting. Sensor component 40 and a transmitter 42 are part of a vehicle 41.

Figure 5:
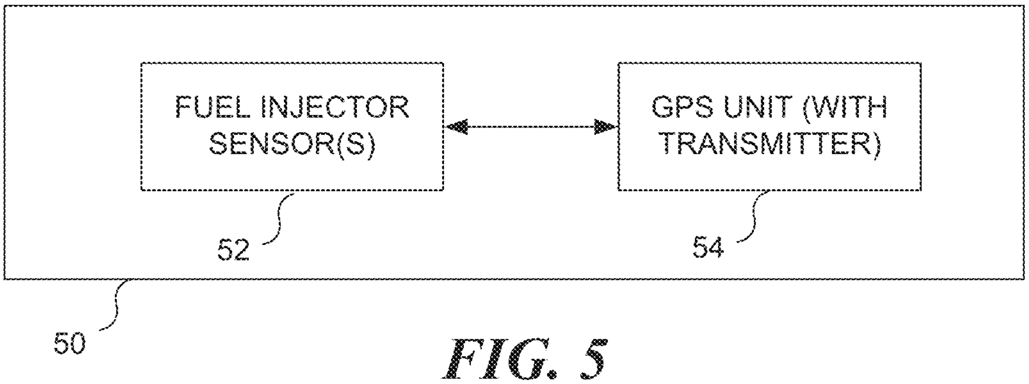
FIG. 5 is a schematic block diagram of an exemplary vehicle configured to collect the fuel use encoded position data employed in the method steps of FIG. 1.

FIG. 5 is a schematic block diagram of an exemplary vehicle configured to collect the fuel use encoded position data employed in the method steps of FIG. 1. A vehicle 50 includes GPS unit 54 (which in this embodiment, includes a transmitter, although it should be recognized that a GPS unit without a transmitter can be coupled with a transmitter or other data link to achieve similar functionality). GPS unit 54 is coupled to fuel injector sensors 52, so that geographical position data and fuel injector data are combined by the GPS unit into fuel use encoded position data. As discussed above, the vehicle can include other sensors (such as an odometer) collecting data that is similarly included in the fuel use encoded position data. Furthermore, the combining of different data types into fuel use encoded position data can be implemented by a processor (not shown in FIG. 5, but discussed above) that is separate from the GPS unit.

Figure 6:
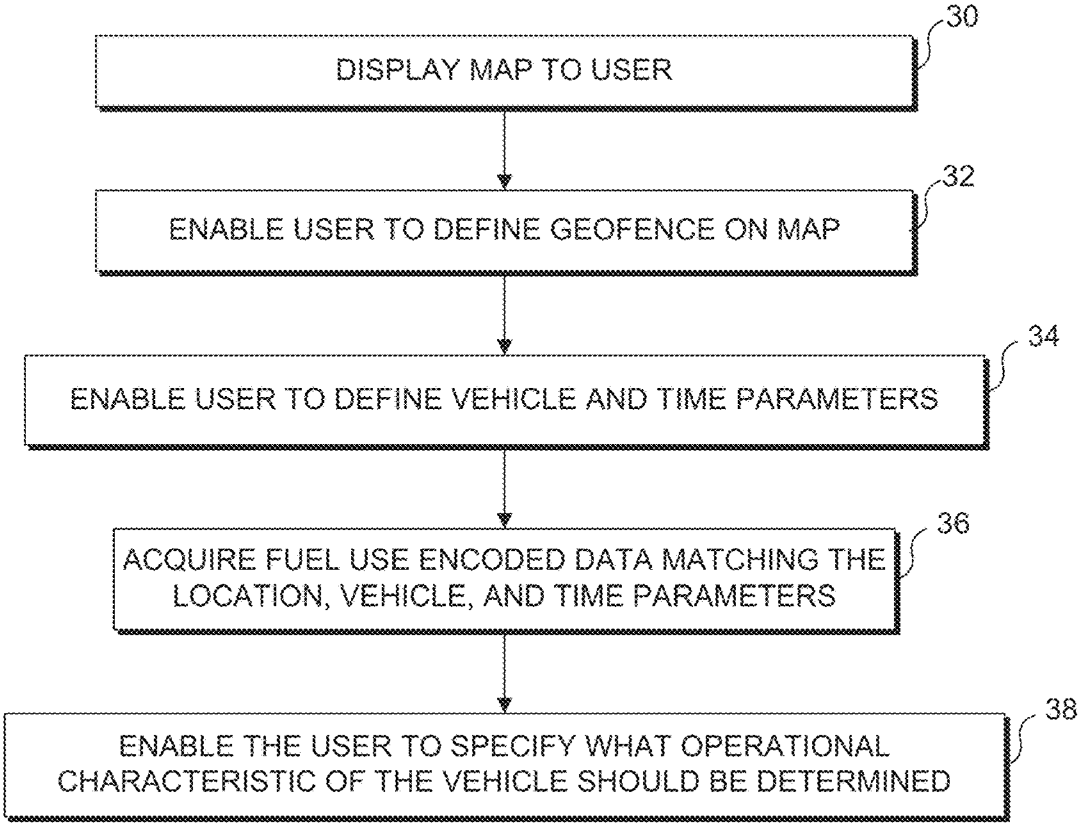
FIG. 6 is a high-level logic diagram showing exemplary overall method steps implemented in accord with the concepts disclosed herein, and summarized above, to utilize fuel encoded position data collected to determine at least one operational characteristic of the vehicle, where the analysis includes enabling the user to define a geofence.

Still another aspect of the concepts disclosed herein is a method for enabling a user to define specific parameters to be used to analyze such fuel use encoded data. In an exemplary embodiment, a user can define a geographical parameter, and analyze the fuel use encoded data in terms of the user defined geographical parameter. In a particularly preferred, but not limiting exemplary embodiment, the geographical parameter is a geofence, which can be generated by displaying a map to a user, and enabling the user to define a perimeter "fence" around any portion of the map. FIG. 6 is a high-level logic diagram showing exemplary overall method steps implemented in accord with the concepts disclosed herein, and summarized above, to utilize fuel encoded position data collected to determine at least one operational characteristic of the vehicle, where the analysis includes enabling the user to define a geofence. It should be understood that the method of FIG. 6 is implemented on a computing system remote from the vehicle collecting the fuel use encoded position data. In at least one exemplary, but not limiting embodiment, the fuel use encoded position data is stored in a networked location and accessed and manipulated by a user at a different location.

In a block 30, a map is displayed to a user. In a block 32, the user is enabled to define a geofence on the map (i.e., by prompting the user to define such a geofence, or simply waiting until the user provides such input). In general, a geofence is defined when a user draws a perimeter around a portion of the displayed map using some sort of computer-enabled drawing tool. Many different software programs enable users to define and select portions of a displayed map, thus detailed techniques for defining a geofence need not be discussed herein. In a block 34, the user is enabled to define a specific vehicle and a time period to be analyzed (i.e., by prompting the user to define such parameters, or simply waiting until the user provides such input). In a block 36, fuel use encoded position data for the specified vehicle, location parameter (as defined by the geofence), and time parameter is retrieved. In a block 38, the user is enabled to define the operational characteristic of the vehicle to be determined. As noted above, exemplary operational characteristics include, but are not limited to, determining a quantity of fuel consumed off road (and thus not subject to road taxes) during the specified period, and monitoring fuel usage for a vehicle traversing the same route a number of times to identify changes in fuel usage not attributable to changes in load or traffic.

Figure 7:
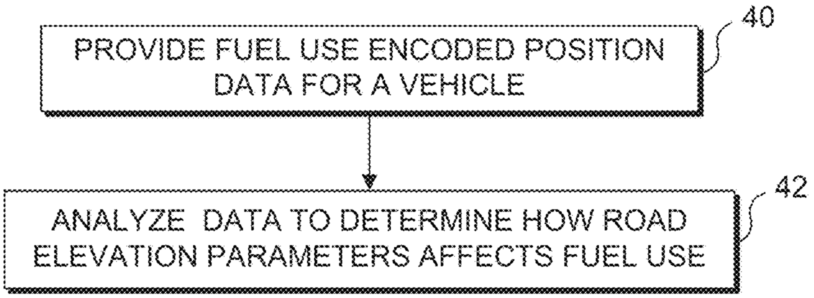
FIG. 7 is a flow chart showing exemplary method steps implemented to utilize fuel encoded position data collected by a vehicle to analyze fuel use patterns based on elevation changes.

Yet another use for the fuel use encoded position data is to provide a data set to be used to analyze fuel consumption relative to elevation change. Referring to FIG. 7, in a block 40 previously generated fuel use encoded position data for a specific vehicle is acquired. As discussed above, such data is collected during operation of the vehicle, and generally stored in a database or memory accessible in a networked environment (public or private). Accessing such data can, if desired, require entering a password or other type of credential to ensure that access to such data is restricted to authorized parties. In a block 42, the accessed data is analyzed to determine how road elevation affects fuel consumption (i.e., fuel use). By quantifying how much fuel is consumed traveling over a route with elevation changes, one can identify alternate, possibly longer routes, that are more fuel efficient due to fewer elevation changes. This analysis may include comparing data collected while traveling different routes connecting the same starting point and destination, where the different routes involve different elevation changes. This analysis may also involve comparing actual data with estimated fuel use over a hypothetical alternate route, to aid in determining if the alternate route (for example, a route that includes fewer elevation changes) is more fuel efficient.

Figure 8:
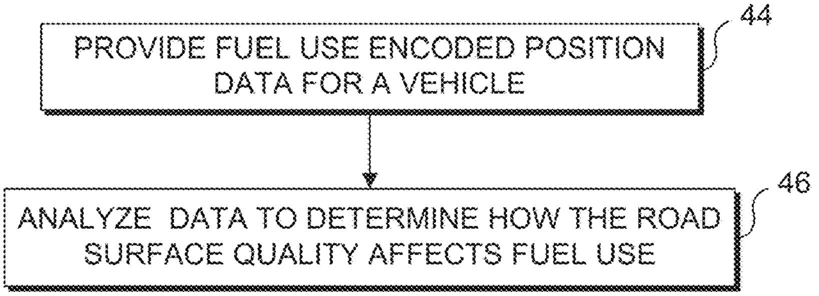
FIG. 8 is a flow chart showing exemplary method steps implemented to utilize fuel encoded position data collected by a vehicle to analyze fuel use patterns based on different types of road surfaces.

A related use for the fuel use encoded position data is to provide a data set to be used to analyze fuel consumption relative to road surface. Referring to FIG. 8, in a block 44 previously generated fuel use encoded position data for a specific vehicle is acquired. In a block 46, the accessed data is analyzed to determine how road surface parameters affect fuel consumption. Analyzing fuel consumption relative to the type of road surface will enable vehicle operators to learn what type of road surfaces are associated with lower fuel consumption. Regularly traveled routes can then be analyzed to determine if an alternate route over a different type of road surface could lead to lower fuel consumption. This analysis may include comparing data collected while traveling different routes connecting the same staring point and destination, where the different routes involve different types of road surfaces. For example, data collected while the vehicle travels a first relatively longer route over a road that has been repaved relatively recently can be compared with data collected while the vehicle travels over a second relatively shorter route over a road that has been not been repaved recently, to determine whether the relatively longer route is more fuel efficient due to the differences in the road surfaces. Other differences in types of road surfaces include grooved surfaces verses un-grooved surfaces, paved surfaces verses unpaved surfaces, and asphalt surfaces verses concrete surfaces. Specifics regarding road types (paved, unpaved, grooved, un-grooved, asphalt, concrete, etc.) can be added to the fuel use encoded position data to help in identifying trends that correlate surface type to fuel use.

Newly Disclosed Subject Matter

FIG. 9 is a flow chart showing exemplary method steps implemented to modify a GPS logging paradigm based on the detection of one or more non-position related parameters. In a block 50 a GPS logging paradigm is defined. In general, such logging paradigms attempt to balance collecting a useful amount of GPS data with minimizing airtime consumption. GPS logging paradigms can be based on time, such that GPS data is collected at predetermined time intervals (such as once a minute, once an hour, or once a day, such intervals being exemplary and not limiting). GPS logging paradigms can include collecting additional GPS data upon vehicle start up (i.e., key on) and/or shut down (i.e., key off). GPS logging paradigms can be based in part on collecting GPS data according to predetermine time intervals, combined with collecting additional GPS data when the vehicle changes speed or heading. Once collected, the GPS data is generally conveyed to a remote computing device using a wireless data link, such as a GSM data link or a satellite data link, noting that such data links are exemplary and not limiting. GPS data can be stored until such a link becomes available. GPS data could also be stored at the vehicle for a period of time and later conveyed to an external computing device using wireless or hard-wired connections. Such a technique will require relatively more data storage, and memory failures in the vehicle can result in loss of data. Many users find regularly data transfer via cellular or satellite to be more convenient.

Referring to FIG. 9, at least one non-position based parameter (in addition to key on/key off) is identified in a block 52 to be used to modify the selected GPS logging paradigm. The concepts disclosed herein specifically encompass using one or more of the following parameters to change the GPS logging paradigm: fuel use, brake temperature, oil temperature, coolant temperature, throttle position, engine load, engine RPM, shift position/gear selected, cruise control status, and/or accessory device status.

In a block 54 GPS data is acquired during vehicle operation according to the selected GPS logging paradigm. In a decision block 56 a determination is made as to whether one of the parameters selected in block 52 has been detected. If not, the logic returns to block 54. If one of the non-position based (nor key on/key off) parameters is detected in block 56, then the logic moves to a block 58 and parameter encoded GPS data is acquired (i.e., the parameter data and current GPS data are logged, so that a later analysis can correlate the parameter data to the GPS data).

FIG. 10A schematically illustrates a GPS logging paradigm based on GPS logging at predetermined time intervals. The line between the start and end labels represents a vehicle route. Each shaded circle represents a GPS data logging event. The different GPS logging events are relatively equally spaced, indicating the vehicle was traveling at a relatively constant speed during the route. This is but one possibly type of a GPS logging paradigm that can be defined in block 50 of FIG. 9.

FIG. 10B schematically illustrates a GPS logging paradigm based on GPS logging at predetermined time intervals, modified based on position based parameters. Rather than logging GPS data according to elapsed time, the GPS data in this paradigm is logged when the vehicle changes speed or direction. Significantly, note the relative dearth of GPS logging in the lower portion of the route, where the vehicle is not making any changes in direction. Such a route can correspond to a relatively straight section of highway. Along such a route segment, where there is no change in speed or heading, there is little need to collect GPS data, and eliminating some GPS logging events will reduce a quantity of airtime consumed.

FIG. 10C schematically illustrates the GPS logging paradigm of FIG. 10B modified based on detecting a non-position based parameter. In this case, the non-position based parameter is turning cruise control on and off. The cruise control was turned on at a location 60 and was turned off at a location 62. The GPS logging paradigm was modified at locations 60 and 62, and the status of the cruise control was recorded at those locations, as well as the GPS coordinates. When an operator of the vehicle reviews the route data, the fact that cruise control was not turned on until location 60, when the route suggests that cruise control could have been turned on near location 64. This type of data will enable operators to educate drivers on how to more efficiently operate vehicles (the use of cruise control generally results in fuel savings). It should be recognized that while FIG. 10C relates to modifying the GPS logging paradigm based on cruise control status, that the concepts disclosed herein specifically encompass modifying the GPS logging paradigm based parameters such as fuel use, brake temperature, oil temperature, coolant temperature, throttle position, engine load, engine RPM, shift position/gear selected, and/or accessory device status. The term accessory device encompasses devices that increase parasitic load and are likely to reduce fuel economy, such as manual cooling fans, air conditioning units, etc.

FIG. 11 is a screen shot of a web page upon which a vehicle owner can view fuel use data overlaid upon vehicle route data, where the fuel use data was collected using the method of FIG. 9. In addition to logging GPS data according to a predefined GPS logging paradigm based, GPS data was also collected when fuel use increased or decreased. The combination of fuel use data and GPS data, presented to a user in the format shown in FIG. 11, enables vehicle operators (such as fleet managers) to quickly review vehicle routes to determine areas associated with relatively good and relatively poor fuel economy. That enables vehicle operators to analyze their routes, to identify conditions associated with greater or lesser fuel efficiency, which may lead to redesigning routes that are traversed on a reoccurring basis to maximize fuel efficiency.

The route for a commercial diesel truck shown in FIG. 11 includes segments where fuel economy was over 7.0 MPG (generally segment 80 shown in green), segments where fuel economy was between 5.1 and 6.9 MPG (generally segment 82 shown in yellow), and segments where fuel economy was under 5.0 MPG (generally segment 84, shown in red, noting the colors are exemplary and not limiting). Specifically, segment 80*a*, segment 80*b* segment 80*c*, and segment 80*d* represent portions of the route associated with good fuel economy. Segment 82*a*, segment 82*b* segment 82*c*, and segment 82*d* represent portions of the route associated with moderate fuel economy. Segment 84*a*, segment 84*b* segment 84*c*, and segment 84*d* represent portions of the route associated with poor fuel economy. Note segment 84*c* is the relatively largest poor fuel economy segment, and the vehicle operator may focus his attention on that portion of the route first, to see if some rerouting might enable that area to be bypassed. Further, such a report can also be analyzed from the aspect of the time of day. For example, familiarity with this route might suggest that poor economy in segment 84*c* is due to traffic volumes and changing the timing of the route may result in increasing the fuel efficiency of that portion of the route, assuming that such time shifting is practical.

Exemplary GPS Device with Onboard Computing Environment

FIG. 12 is a functional block diagram of an exemplary telematics device added to an enrolled vehicle to implement one or more of the methods of FIGS. 1 and 9.

An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data input component 168 configured to extract vehicle data from the vehicle's data bus and/or the vehicle's onboard controller (noting that the single input is exemplary, and not limiting, as additional inputs can be added, and such inputs can be bi-directional to support data output as well).

The capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use data link 164 to (wirelessly in an exemplary but not limiting embodiment) convey such data to vehicle owners. These data transmission can occur at regular intervals, in response to a request for data, or in real-time, or be initiated based on parameters related to the vehicle's speed and/or change in location, and/or the change in logging parameters discussed above. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using data link 164. If desired, additional memory can be included to temporarily store data when the data link cannot transfer data. In particularly preferred embodiments the data link is GSM or cellular technology based.

In at least one embodiment, the controller is configured to implement the method of FIG. 1 by using one or more of data collected from position sensing component 170 (in some embodiments, a GPS receiver) and data from data input component 168. In a related embodiment, the controller is configured to implement the method of FIG. 9 by using one or more of data collected from position sensing component 170 and data from data input component 168.

Non-Transitory Memory Medium

Many of the concepts disclosed herein are implemented using a processor that executes a sequence of logical steps using machine instructions stored on a physical or non-transitory memory medium. It should be understood that where the specification and claims of this document refer to a memory medium, that reference is intended to be directed to a non-transitory memory medium. Such sequences can also be implemented by physical logical electrical circuits specifically configured to implement those logical steps (such circuits encompass application specific integrated circuits).

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for generating non-position parameter encoded position data from a vehicle equipped with a geographical position system, the method comprising the steps of:

(a) collecting geographical position data from the vehicle during vehicle operation according to a defined logging paradigm, the geographical position data being time indexed;

(b) determining if a plurality of criteria are satisfied for a corresponding plurality of predefined parameters during vehicle operation, the plurality of criteria for the corresponding plurality of predetermined parameters is taken from a group consisting essentially of:

(i) an increase in an amount of fuel consumed by the vehicle;

(ii) a decrease in an amount of fuel consumed by the vehicle;

(iii) a change in a status of a cruise control component;

(iv) a change in a status of an accessory component associated with a parasitic load; and (v) a change in throttle position;

(c) in response to detecting the satisfaction of the criterion for the predefined parameter during vehicle operation, modifying the defined logging paradigm to collect additional geographical position data at the time the satisfaction of the criterion is detected;

(d) collecting data corresponding to the corresponding plurality of predefined parameters, for which the plurality of criteria satisfaction has been detected;

(e) wherein the plurality of criteria for the corresponding plurality of predefined parameters includes an increase in the rate of fuel consumption of the vehicle as measured by a fuel flow sensor associated with a fuel injector of the vehicle, and the data corresponding to the predefined parameter specifies the increase in the rate of fuel consumption of the vehicle;

(f) wherein the plurality of criteria for the corresponding plurality of predefined parameters includes a decrease in the rate of fuel consumption of the vehicle as measured by the fuel flow sensor associated with a fuel injector of the vehicle, and the data corresponding to the predefined parameter specifies the decrease in the rate of fuel consumption of the vehicle; and (g) analyzing the collected data corresponding to the corresponding plurality of predefined parameters for which the plurality of criteria satisfaction has been detected to determine at least one operating characteristic of the vehicle and displaying a route traversed by the vehicle with increases in fuel use as measured by the fuel flow sensor and decreases of fuel consumption as measured by the fuel flow sensor overlaid on the route, such that the displayed route includes a plurality of displayed route segments, wherein each displayed route segment displays, at the same time, one of a plurality of different fuel-consumption ranges, which include good, moderate, and poor, and for which a plurality of corresponding fuel-consumption-range definitions, specified in miles-per-gallon, of the plurality of fuel-consumption ranges is also displayed, and displaying the route start date and time, the route end date and time, the route distance, and the amount of fuel used to facilitate changing a start time of the route in the future to increase fuel economy, by avoiding heavy traffic, along the route, wherein the displayed plurality of different fuel-consumption ranges are determined, at least in part, by the increase in the rate of fuel consumption of the vehicle as measured by the fuel flow sensor associated with the fuel injector of the vehicle and by the decrease in the rate of fuel consumption of the vehicle as measured by the fuel flow sensor associated with the fuel injector of the vehicle.

2. The method of claim 1, further comprising the steps of combining the parameter data and the geographical position data together at the vehicle to produce parameter encoded position data.

3. The method of claim 2, further comprising the step of conveying the parameter encoded position data to a remote computing device that is physically spaced apart.

4. The method of claim 1, wherein the plurality of criteria for a corresponding plurality of predefined parameters includes a change in a status of a cruise control component, and the data corresponding to the predefined parameter specifies the change in the status of the cruise control component.

5. The method of claim 1, wherein the plurality of criteria for a corresponding plurality of predefined parameters includes a change in a status of an accessory component associated with a parasitic load, and the data corresponding to the predefined parameter specifies the change in the status of the accessory component associated with the parasitic load.

6. The method of claim 1, wherein the plurality of criteria for a corresponding plurality of predefined parameters includes a change in throttle position, and the data corresponding to the predefined parameter specifies the change in throttle position.

7. A method for generating and using event encoded position data from a vehicle equipped with a geographical position system to determine at least one event based operational characteristic of the vehicle, the method comprising the steps of:

(a) collecting geographical position data from the vehicle during vehicle operation;

(b) collecting non-position related parameter data from the vehicle during operation of the vehicle based on the detection of a predefined event, the non-position related parameter data being time indexed to correlate the non-position related parameter data to a specific point in time, the non-position related parameter comprising at least one of fuel consumption, cruise control status, accessory device status; and throttle position;

(c) conveying the geographical position data and the non-position related parameter to a remote computing device, such data collectively comprising event encoded position data; and (d) analyzing the event encoded position data to determine at least one operating characteristic of the vehicle, wherein the step of analyzing the event encoded position data to determine at least one operating characteristic of the vehicle comprises the step of displaying a route traversed by a vehicle with transmission gear selection position data overlaid on the route, the transmission gear selection data having been included in the event encoded position data, such that the displayed route includes a plurality of displayed route segments, wherein each displayed route segment displays, at the same time, one of a plurality of different gear-selection-position values thereby indicating at which vehicle locations the driver has shifted gears, one of a plurality of different fuel-consumption ranges, which include good, moderate, and poor, and for which a plurality of corresponding fuel-consumption-range definitions, specified in miles-per-gallon, of the plurality of fuel-consumption ranges is also displayed, and the route start date and time, the route end date and time, the route distance, and the amount of fuel used are displayed to facilitate changing a start time of the route in the future to increase fuel economy, by avoiding heavy traffic, along the route, wherein the displayed plurality of different fuel-consumption ranges are determined, at least in part, by the increase in the rate of fuel consumption of the vehicle as measured by the fuel flow sensor associated with the fuel injector of the vehicle and by the decrease in the rate of fuel consumption of the vehicle as measured by the fuel flow sensor associated with the fuel injector of the vehicle.

8. The method of claim 7, wherein the step of analyzing the event encoded position data to determine at least one operating characteristic of the vehicle comprises the step of displaying a route traversed by a vehicle with fuel use overlaid on the route, the fuel use being determined by fuel use included in the event encoded position data.

9. The method of claim 7, wherein the step of analyzing the event encoded position data to determine at least one operating characteristic of the vehicle comprises the step of displaying a route traversed by a vehicle with cruise control use overlaid on the route, the cruise control use being determined by cruise control status included in the event encoded position data.

10. The method of claim 7, wherein the step of analyzing the event encoded position data to determine at least one operating characteristic of the vehicle comprises the step of displaying a route traversed by a vehicle with accessory device use overlaid on the route, the accessory device use being determined by accessory device status included in the event encoded position data.

11. The method of claim 7, wherein the step of analyzing the event encoded position data to determine at least one operating characteristic of the vehicle comprises the step of displaying a route traversed by a vehicle with throttle position data overlaid on the route, the throttle position data having been included in the event encoded position data.

12. The method of claim 7, wherein the step of analyzing the event encoded position data to determine at least one operating characteristic of the vehicle comprises the step of enabling a user to define a geofence, such that only event encoded position data falling within the confines of the geofence are included within the analysis.

* * * * *